United States Patent [19]

Nakajima et al.

[11] Patent Number: 4,591,986

[45] Date of Patent: May 27, 1986

[54] APPARATUS FOR CONTROL OF TRANSITION TO AUTO-CRUISE

[75] Inventors: Tetsuo Nakajima; Tomio Aoi, both of Saitama, Japan

[73] Assignee: Honda Giken Kogyo Kabushiki Kaisha, Tokyo, Japan

[21] Appl. No.: 571,890

[22] Filed: Jan. 18, 1984

[30] Foreign Application Priority Data

Jan. 27, 1983 [JP] Japan .................. 58-10520

[51] Int. Cl.⁴ .............................................. B60K 31/00
[52] U.S. Cl. .............................. 364/426; 364/431.01; 180/179; 123/352
[58] Field of Search .................... 364/424, 426, 431.01, 364/431.07; 180/170, 174, 176–179; 123/351, 352, 376

[56] References Cited

U.S. PATENT DOCUMENTS

| | | | |
|---|---|---|---|
| 3,752,252 | 8/1973 | Sakakibara | 123/351 |
| 3,766,367 | 10/1973 | Sumiyoshi et al. | 364/424 |
| 3,804,193 | 4/1974 | Ikuta | 180/170 |
| 4,215,760 | 8/1980 | Sakakibara | 180/176 |
| 4,463,822 | 8/1984 | Tanigawa et al. | 180/177 |

Primary Examiner—Gary Chin
Attorney, Agent, or Firm—Pollock, Vande Sande and Priddy

[57] ABSTRACT

This invention provides an apparatus for the control of the transition to auto-cruise, which is capable of precluding detrimental phenomena such as dipping and hunting of the automobile speed while the control of the automobile speed is in transition from the manual status to the automatic status. In accordance to this invention, when the auto-cruise status is set, the apparatus unconditionally effects an initial setting of the throttle position to a provisional target throttle position which is dependent on the automobile speed as it exists at that moment, namely the target speed of the automobile, and thereafter the apparatus detects the deviation of the real speed of the automobile from the target automobile speed and, based on this deviation, effects feedback control of the throttle position.

3 Claims, 11 Drawing Figures

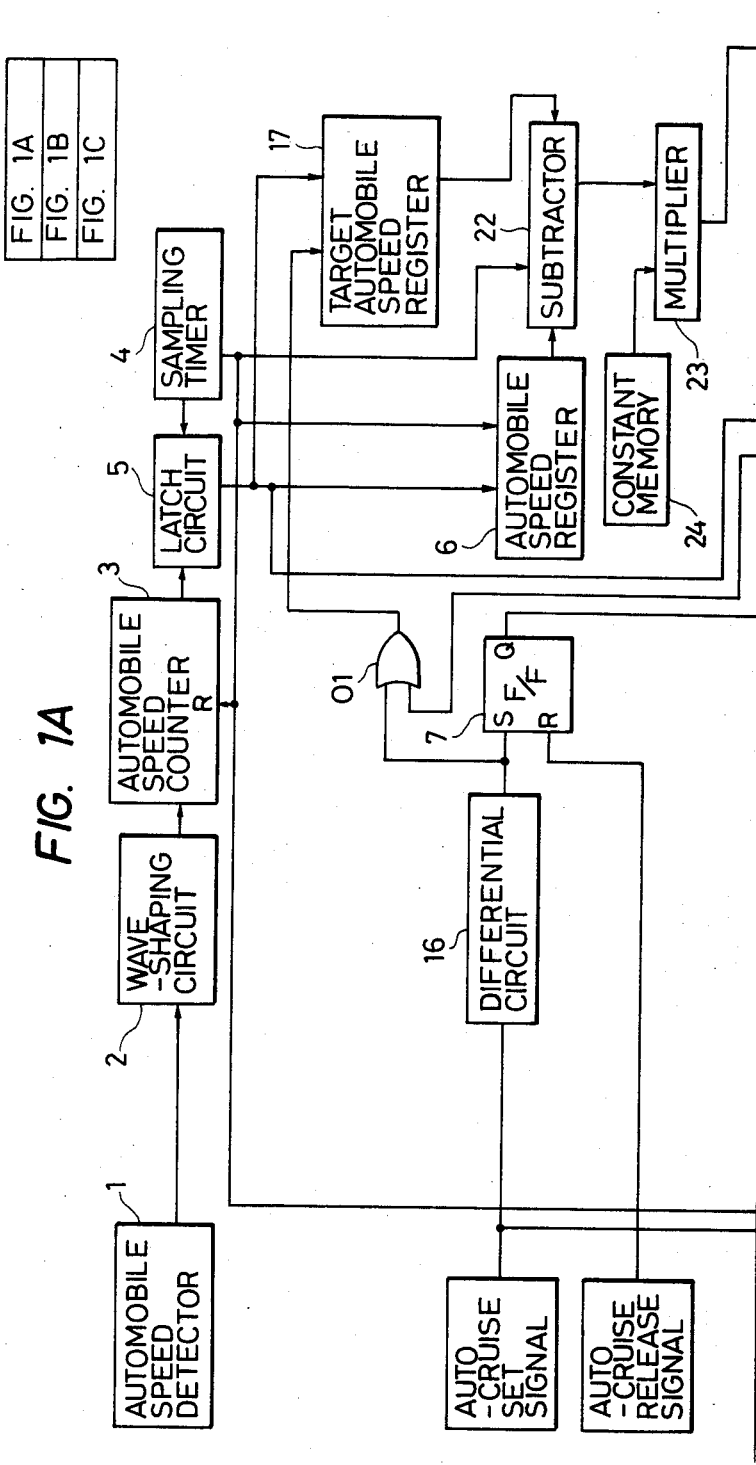

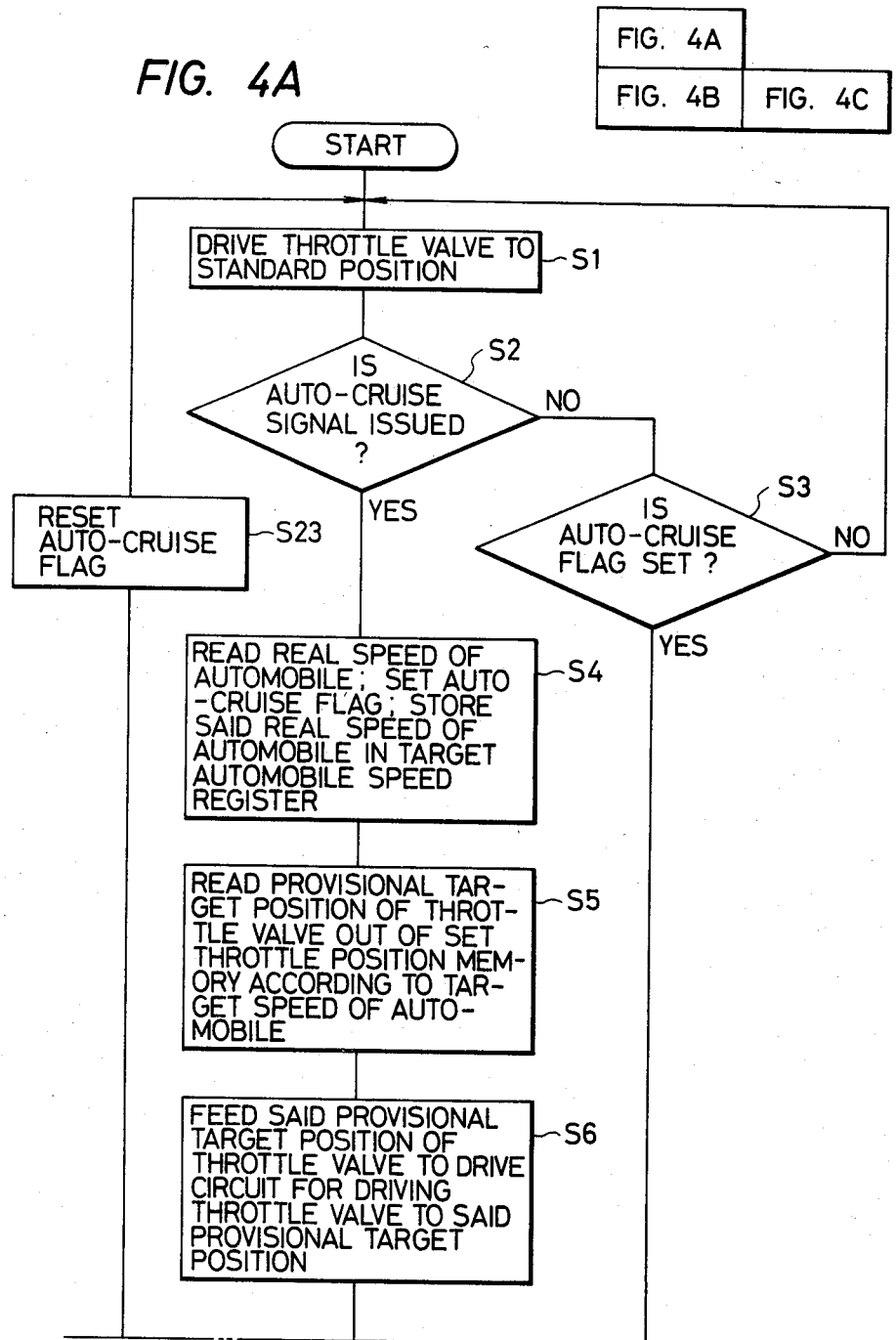

APPARATUS FOR CONTROL OF TRANSITION TO AUTO-CRUISE

BACKGROUND OF THE INVENTION

(1) Field of the Invention

This invention relates to an apparatus for controlling the speed of an automobile while it is in transition from manual control by the driver of the automobile to automatic control (so-called "auto-cruise"), and more particularly to an apparatus for the control of the transition to auto-cruise, which precludes detrimental phenomena such as dipping and hunting of the automobile speed during a change in the control automobile speed from manual control to automatic control.

(2) Description of the Prior Art

Conventional apparatus for the control of transition to the auto-cruise has been designed to effect the setting of the initial throttle position during the transition of the automobile speed control from manual control to automatic control, namely at the time that the status of auto-cruise is set. The conventional technique, however, relies for the setting of the auto-cruise status upon the intake manifold depression of the automobile engine. This has the disadvantage that, since the magnitude of the intake manifold depression is variable under the influence of the operating condition of the automobile as it exists during the transition to auto-cruise, the throttle position is not easily set with high accuracy and, after completion of the transition to the auto-cruise, the automobile speed is liable to dip and fluctuate.

SUMMARY OF THE INVENTION

The present invention is aimed at eliminating the disadvantage described above. An object of this invention, therefore, is to provide an apparatus for the control of the transition to auto-cruise, which is capable of precluding detrimental phenomena such as dipping and hunting of the automobile speed while the control of the automobile speed is in transition from the manual status to the automatic status.

To accomplish the object described above, this invention utilizes a motor for the control of throttle position and, the apparatus when the auto-cruise status is set, unconditionally effects initial setting of the throttle position to a value predetermined according to the automobile speed as it exists at that moment, namely the target speed of the automobile, and thereafter detects a deviation of the real speed of the automobile from the target automobile speed and, based on this deviation, carries out feedback control of the throttle position.

DETAILED DESCRIPTION OF THE PREFERRED EMBODIMENTS

Figure 1B:
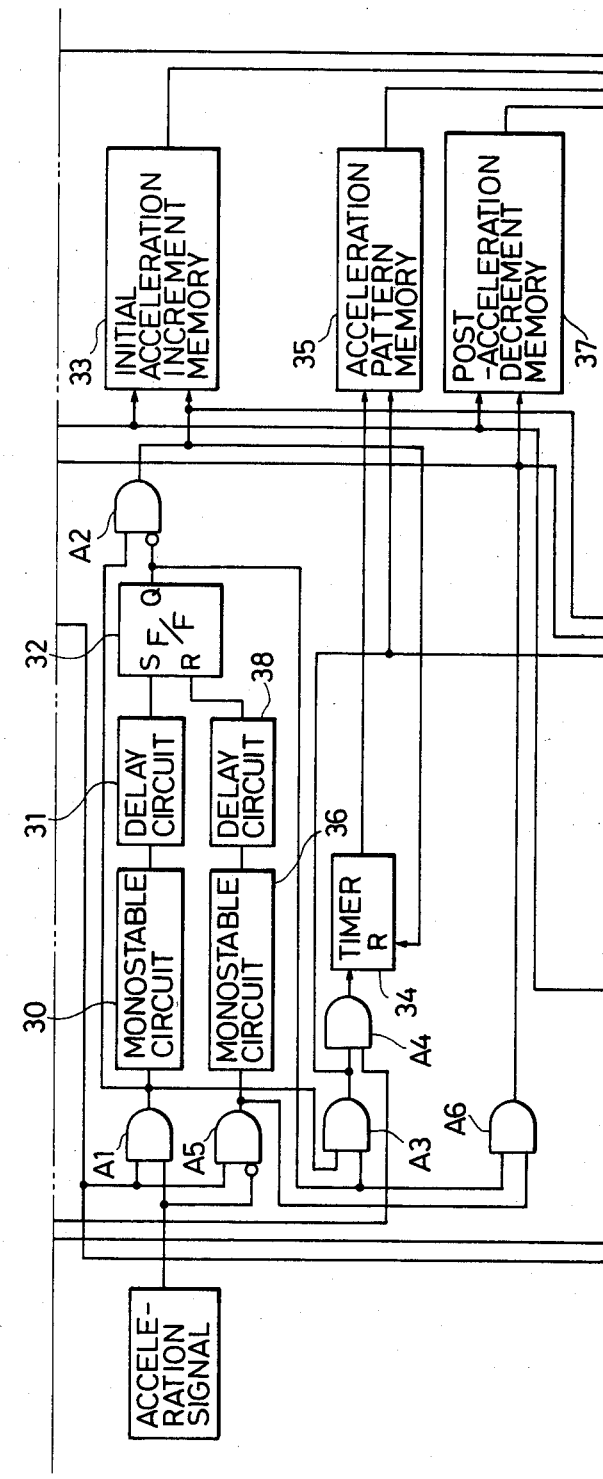
FIG. 1 shows how to combine FIGS. 1A, 1B and 1C, which together comprise a block diagram illustrating a first embodiment of the present invention.
Figure 1C:
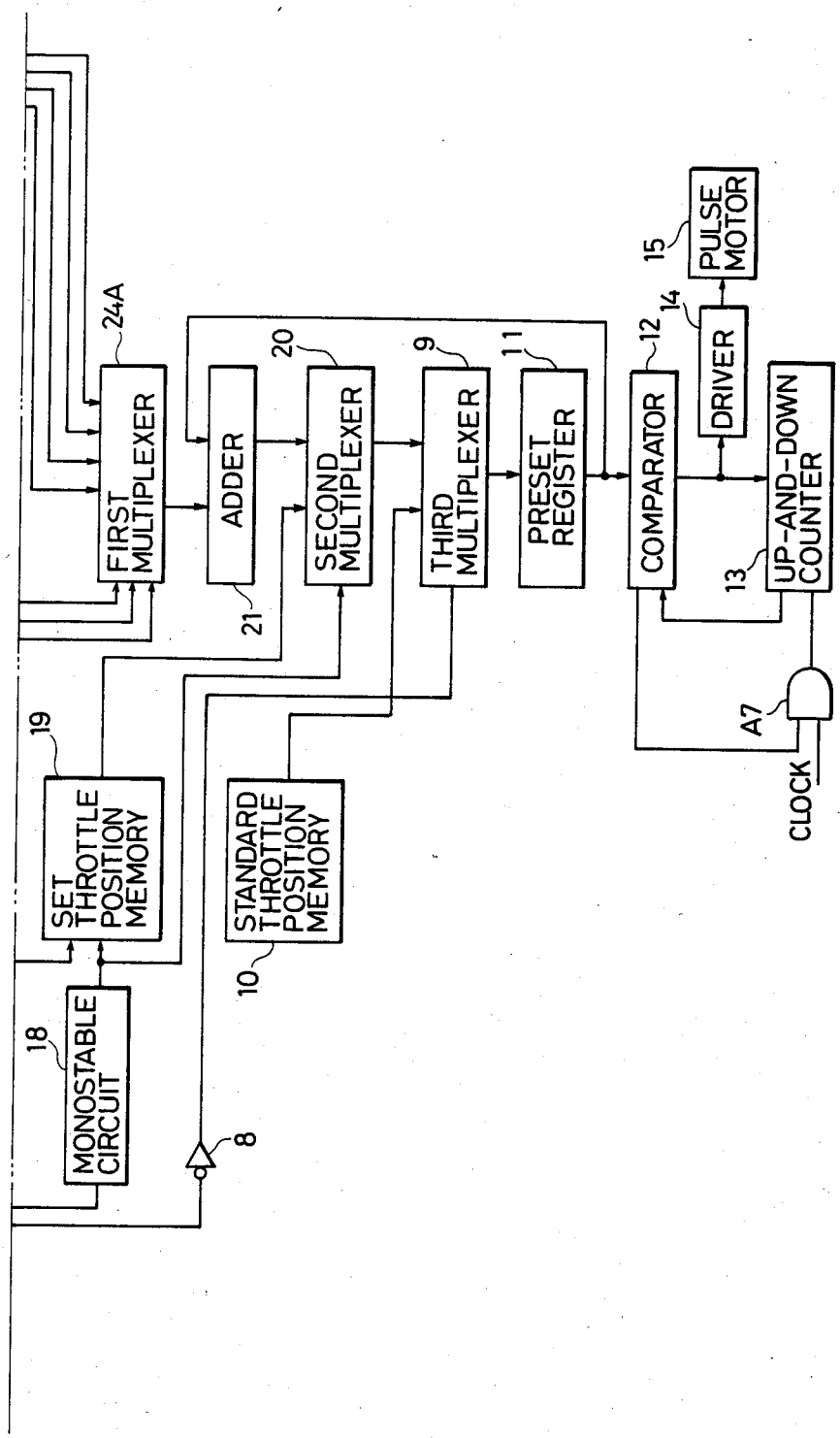

Now, the present invention will be described in detail below with reference to the accompanying drawings. FIGS. 1A, 1B and 1C show a block diagram illustrating an embodiment of the present invention.

An automobile speed detector 1 issues pulses of a cycle inversely proportional to the real speed of an automobile. The aforementioned pulses are shaped by a wave-shaping circuit 2 and then counted by an automobile speed counter 3. The value of the count in the automobile speed counter 3 within a fixed time interval, therefore, represents the real speed of the automobile.

A sampling timer 4 generates a single timing pulse during each such a fixed time interval and said timing pulse transfers the value of count in the automobile speed counter 3 to a latch circuit 5 and latches that value in the latch circuit 5 and, at the same time, resets the automobile speed counter 3. The real speed of the automobile temporarily memorized in the latch circuit 5 is caused by the aforementioned timing pulse from the sampling timer 4 to be stored in an automobile speed register 6.

While the auto-cruise set is in a released state, namely while the automobile is under manual speed control, an auto-cruise flag (flipflop) 7 is in its reset state (with the output "0"). Consequently, the output from an inverter 8 is at its high level and a third multiplexer 9 selects the output from a standard throttle position memory 10 and feeds it to a preset register 11. In the standard throttle position memory 10, a throttle position corresponding to the idle operation of the automobile engine is stored in advance.

A comparator 12 compares the value in an up-and-down counter 13, which stores the current position of a pulse motor 15, with the value stored in the aforementioned preset register 11 and, depending on the difference between these two values, drives a driver 14 and the pulse motor 15. As the result, the rotational position of the pulse motor 15 or the throttle valve is maintained substantially constant. Such a controlling operation of the pulse motor 15 as described above is described in detail in the specifications of Japanese Laid-Open Patent Applications Nos. SHO 58(1983)-155255 and SHO 58(1983)-155256.

In this case, as indicated in the aforementioned specifications, the throttle valve position can be freely controlled by the automobile driver's own experienced operation of the accelerator pedal.

When an auto-cruise set signal is issued while the speed of the automobile is being manually controlled as described above, a differential circuit 16 generates a pulse output which sets the auto-cruise flag flip-flop 7. At the same time, the pulse output from the differential circuit 16 is fed via an OR circuit 01 to a target automobile speed register 17. As the result, the target automobile speed register 17 stores the output from the latch circuit 5 as it exists at that very moment, namely, the real speed of the automobile, as the target speed of the automobile to be referred to thereafter.

In the meantime, the aforementioned auto-cruise set signal is also fed to a monostable circuit 18. The resultant output pulse from the monostable circuit 18 operates to read out of a memory 19 the target position of the throttle on setting of auto-cruise (memory 19 is hereinafter referred to simply as "a set throttle position memory"). In this set throttle position memory 19, the provisional target of throttle position to be fixed by the parameter of the target speed of the automobile is stored in advance.

Figure 2:
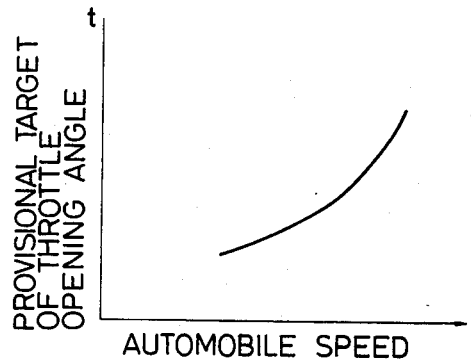
FIG. 2 is a graph showing a typical relation between real speed of an automobile and provisional target value of throttle opening angle or position.

As the provisional target of throttle position, it is desirable to adopt the throttle position which corresponds to that target speed of the automobile which is applicable to the travel of the automobile on a flat road. A typical example of the provisional target of throttle position is illustrated in FIG. 2. In the graph, the horizontal axis represents the speed of the automobile and the vertical axis represents the value of provisional target of throttle opening angle.

Since the set throttle position memory 19 has already stored the target speed of the automobile at the time that it receives an auto-cruise set signal as its input, it immediately provides an input to a second multiplexer 20 which represents a provisional target throttle position corresponding to the real speed of the automobile as its exists at that moment.

The output pulse from the monostable circuit 18 causes the second multiplexer 20 to select the provisional target of the throttle position from the set throttle position memory 19 and feed it to a third multiplexer 9.

At this time, since the auto-cruise flag flip-flop 7 is in its set state and the output of the inverter 8 is consequently at its low level, the third multiplexer 9 selects the output of the second multiplexer 20 (namely, the aforementioned provisional target of the throttle position) and causes it to be stored in the preset register 11. As the result, the pulse motor 15 is energized and the throttle valve is abruptly moved to the position corresponding to the aforementioned provisional target thereof. At the same time, the value stored in the preset register 11 is fed to an adder 21.

In the meantime, the real speed of the automobile is being stored via latch circuit 5 in the automobile speed register 6 at fixed sampling time intervals (such as, for example, 0.5 second) as described above. This real speed of the automobile is compared in a subtractor 22 with the target speed of the automobile from the target automobile speed register 17. The difference between the two values is fed to a multiplier 23.

In the mlutiplier 23, the aforementioned difference is multiplied by a constant read out of a constant which is memory 24, and the product of this multiplication is converted into an amount of compensation (a positive or negative number of pulses) for the rotational angle of the pulse motor 15. This amount of compensation is fed via a first multiplexer 24A to the adder 21.

This adder 21, as already described, has taken into storage the output from the preset register 11, namely, the provisional target of the throttle position. As the result, the output from the adder 21 is proportionate to the rotational angle or position of the pulse motor 15 corresponding to the throttle position necessary for acquiring the target speed of the automobile as its exists at that moment.

The aforementioned output from the adder 21 is fed through the second multiplexer 20 and the third multiplexer 9 and then stored in the preset register 11 and further fed into the comparator 12.

As will be readily understood from what has been described thus far, the rotational angle of the pulse motor 15 and the opening angle of the throttle are controlled by means of feedback to have the respective values necessary for retaining the target speed of the automobile.

As is clear from the foregoing description, the present invention initially sets the throttle position, during the course of auto-cruise set, at a provisional target position which is determined in advance according to the target speed of the automobile, finds the deviation of the real speed of the automobile relative to the target speed of the automobile, and carries out the feedback control of the throttle position, with said target position of the throttle valve as the starting point.

Consequently, the present invention manifests advantageous effects such as decreasing (or approximating to average) the deviation immediately after the auto-cruise set, precluding adverse phenomena like decreasing and or hunting of the speed of the automobile, and shortening the time required for convergence to the target speed of the automobile. Thus, it can notably smoothen the transition from manual control to auto-cruise control.

Now, for the purpose of facilitating comprehension of the general principle of auto-cruise, the acceleration of an automobile in motion in the status of auto-cruise will be described below with reference to FIG. 1, although it has very remote direct bearing upon the present invention.

When the driver of the automobile actuates an acceleration switch while the automobile is in auto-cruise, namely while the auto-cruise flag flip-flop 7 is in its set state, issuance of an acceleration signal continues so long as the acceleration switch is kept operated. The output of flip-flop 7 and the said acceleration signal are fed as inputs to a gate A1, and the resultant output of the AND gate A1 triggers a monostable circuit 30 which feeds out one pulse. This output of one pulse is fed to a delay circuit 31 which in turn provides an input to a flip-flop 32 to set the flip-flop 32 after the time delay imposed by circuit 31.

Prior to the setting of flipflop 32 by the delayed output of the AND gate A1, an AND gate A2 issues an output "1" which causes a read-out of data stored in a memory 33 for the addend or the throttle opening angle to be increased at the beginning of acceleration (hereinafter referred to simply as "an initial acceleration increment memory"). The data read out of said initial acceleration increment memory 33, namely the value of incremental addition, is fed via the first multiplexer 24A to the adder 21.

Consequently, the value stored in the preset register 11 is increased by the aforementioned value of incremental addition and the pulse motor 15 is rotated by an angle corresponding to this value of incremental addition and the throttle opening angle is proportionately increased. As the result, there is an acceleration of the real speed of the automobile. In this case, the value of incremental addition to be stored in the initial acceleration increment memory 33 has, as its parameter, the real speed of the automobile as it exists at that moment.

When the output of the monostable circuit 30 which has been delayed by the delay circuit 31 is supplied to the set terminal of the flipflop 32, said flipflop 32 is set. At this time, since the acceleration signal still continues to exist, an output is provided from an AND gate A3 to the input of an AND gate A4. A second input to gate A4 is provided by the output of sampling timer 4, and gate A4 accordingly provides an output to timer 34 consisting of a series of pulses which correspond to the output pulses from sampling timer 34.

Consequently, timer 34 takes count of the timing pulses issued from the sampling timer 4. The output from the timer 34, therefore, represents the time which elapses since the execution of the incremental addition immediately after acceleration.

In the meantime, the output "1" from the AND gate A3 also causes selection of an acceleration pattern memory 35 and, at the same time, switches the first multiplexer 24A so a to derive readout data from the aforementioned acceleration pattern memory 35.

The acceleration pattern memory 35 has stored therein the value of incremental addition required for acceleration with the aforementioned elapse of time as its parameter. This value of incremental addition is also fed via the adder 21, the second multiplexer 20 and the third multiplexer 9 to the preset register 11.

As the result, the comparator 12 generates an output to actuate the pulse motor 15 and increase the throttle opening angle each time the sampling timer 4 issues a sampling pulse.

When the desired acceleration is completed and the acceleration signal disappears, an output signal "1" is provided by an AND gate A5 which triggers a monostable circuit 36. At the same time, the output from the AND gate A5 is provided as an input an AND gate A6, and the resultant output from this AND gate A6 is fed via the OR gate 01 to the target automobile speed register 17 thereby to cause the target automobile speed register 17 to store the real speed of the automobile existing at that moment as a new target speed of the automobile.

At the same time that the new target speed is stored in register 17, the output from the AND gate A6 causes selection of a post-acceleration decrement memory 37 and the first multiplexer 24A selects the readout data of the post-acceleration decrement memory 37 and feeds it out. The post-acceleration decrement memory 37 has stored therein the subtrahend or the amount of compensation in the decreasing direction of the throttle opening angle to be executed immediately after disappearance of the acceleration signal, with the real speed of the automobile as its parameter.

When the acceleration is completed, therefore, the aforementioned amount of compensation in the decreasing direction is applied via the first multiplexer 24A to the adder 21 and the compensated target value of throttle opening angle is forwarded through the second multiplexer 20 and the third multiplexer 9 and stored in the present register 11.

In this manner, the throttle opening angle is decreased after disappearance of the acceleration signal by a fixed value to be determined according to the real speed of the automobile as it exists at that moment.

The output pulse from the aforementioned monostable circuit 36 is delayed by a predetermined time in a delay circuit 38 and injected into the reset terminal of the flipflop 32 to reset it. As the result, the AND gates A2, A3, and A6 are closed.

After that, auto-cruise control is effected on the accelerated, new target speed of the automobile in the same manner as described above.

Figure 3A:
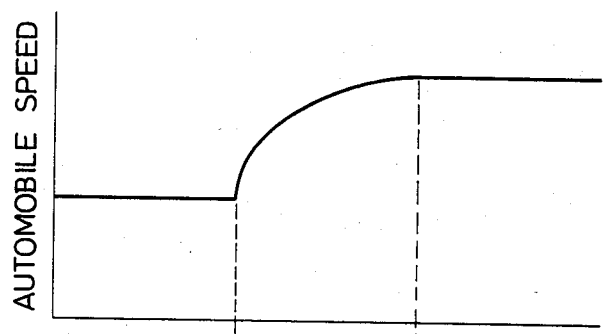
FIGS. 3A and 3B are the graphs showing typical variations in real speed of an automobile and throttle opening angle as functions of time as the automobile is accelerated in auto-cruise.
Figure 3B:
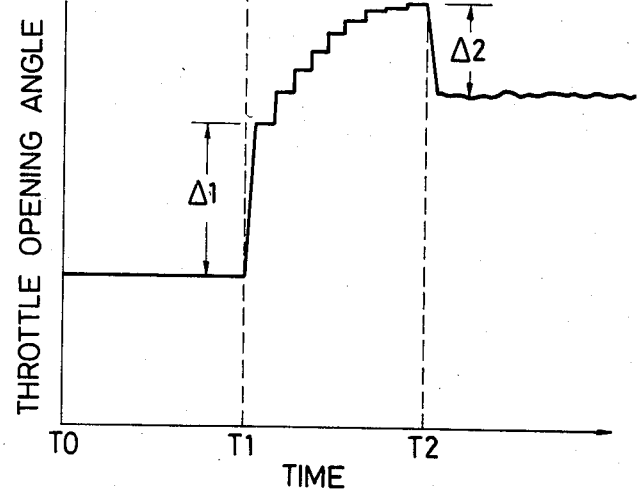

FIGS. 3 (A) and 3 (B) are diagrams illustrating typical variations in speed of automobile and throttle position under the conditions of the aforementioned auto-cruise and acceleration control. The time from the point T0 to the point T1 represents the ordinary period of auto-cruise in which the real speed of the automobile and the position of the throttle are maintained substantially constant. The time between the points T1 and T2 represents the period during which the driver of the automobile operates the acceleration switch so that the acceleration switch keeps issuing acceleration signals.

At the time T1, the throttle opening angle is abruptly increased by the value $\Delta 1$ which corresponds to the readout data from the initial acceleration increment memory 33 and the real speed of the automobile is proportionately increased. After that, the throttle opening angle is increased at each fixed time interval according to the readout data from the acceleration pattern memory 35 and the real speed of the automobile keeps on increasing.

In this case, the readout data mentioned above are desired to be fixed so that the amount of the throttle opening angle to be increased for each fixed time interval will successively decrease with elapse of time.

At the time T2, when operation of the acceleration switch is stopped, the throttle valve is abruptly closed by the value $\Delta 2$ proportionate to the real speed of the automobile as it exists at that moment, in accordance the readout data from the post-acceleration decrement memory 37. The normal auto-cruise is resumed immediately thereafter.

With reference to the block diagram of FIG. 1, the set throttle position memory 19 may use the position of the transmission gears and/or the rotational number of the engine as its parameters instead of the speed of the automobile.

Optionally, memories such as the set throttle position memory 19, the initial acceleration increment memory 33, the acceleration pattern memory 35, and the postacceleration decrement memory 37 may be provided by at least two different memories which are interchangeably put to use. Otherwise, the readout data from these memories may be suitably compensated as by addition or multiplication before they are fed to the subsequent circuits.

This special arrangement enables the driver of the automobile to select the manner of the transition of the automobile control from manual control to auto-cruise control (slow smooth transition or abrupt transition) and the manner of acceleration (slow acceleration or abrupt acceleration), depending on his personal preference or the operating condition existing on the particular occasion.

Thus far, the transition of the control of the speed of automobile from the driver's manual control to the automatic control and the control of the acceleration in the status of the auto-cruise as contemplated by the present invention have been described as being embodied with hardware resorting to wired logic circuits. As is quite evident to those skilled in the art, this invention can also be embodied with the aid of an electronic computer.

Figure 4B:
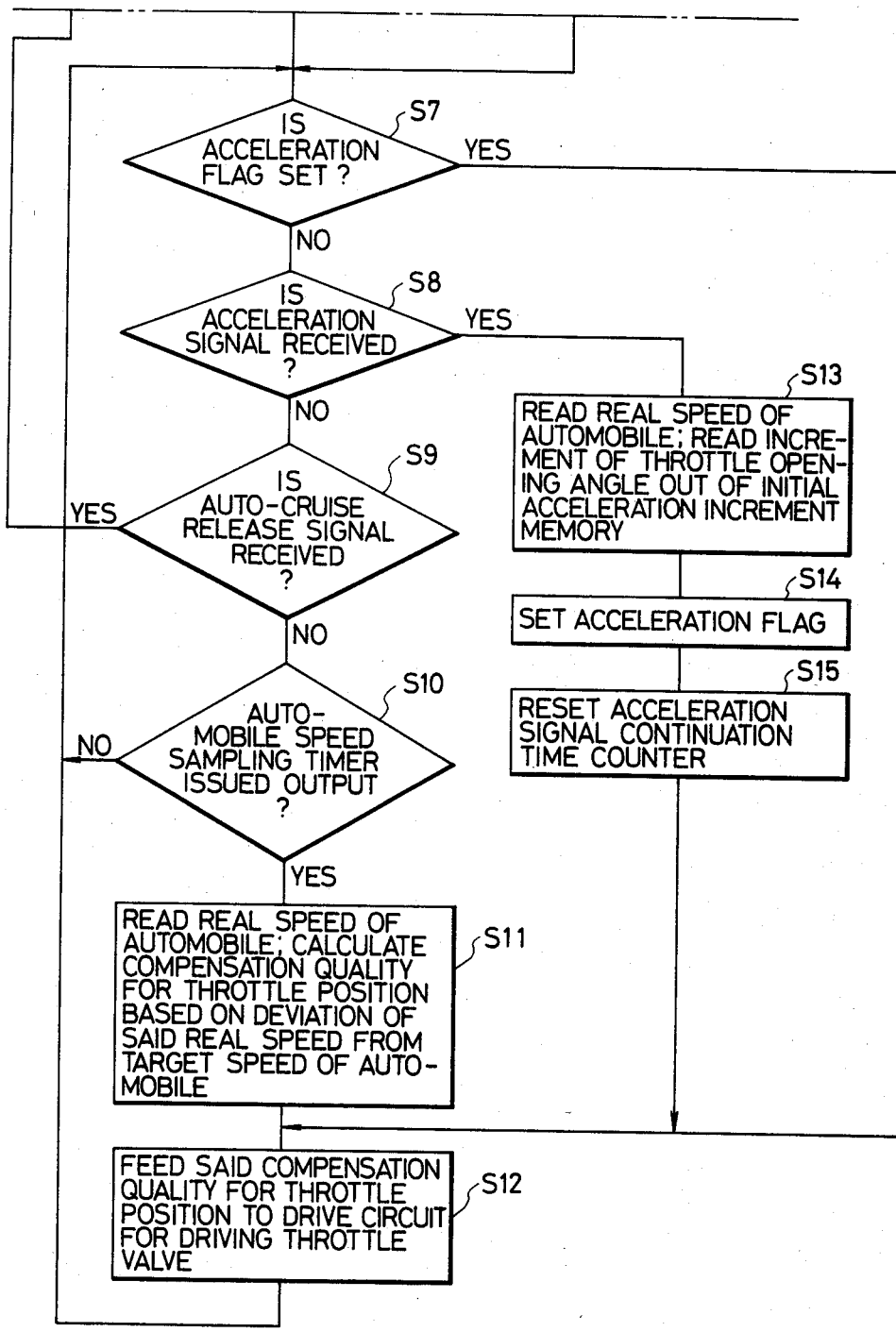
FIG. 4 shows how to combine FIGS. 4A, 4B and 4C, which together comprise a typical flow chart illustrating typical operations of the present invention effected by the use of an electronic computer.
Figure 4C:
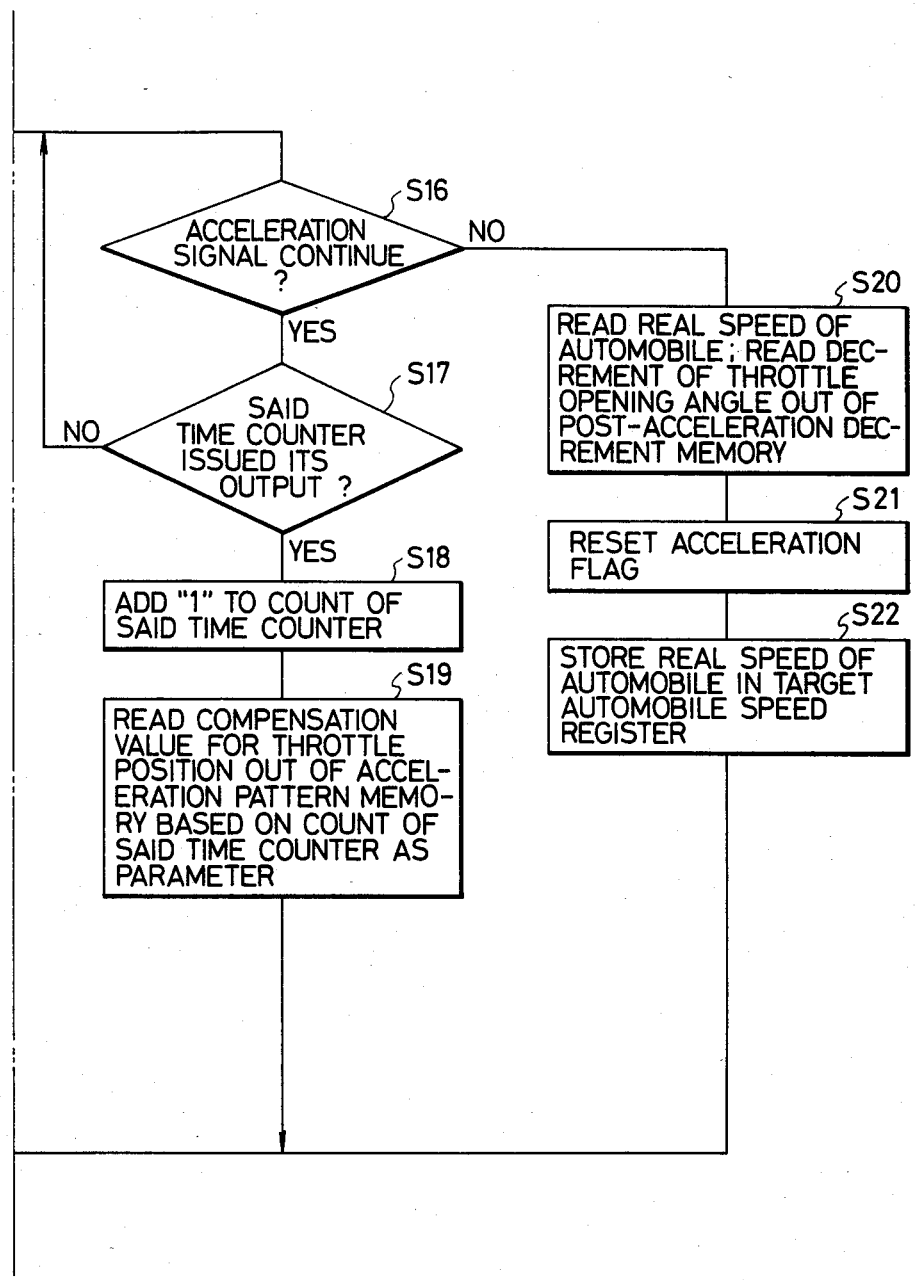

The steps which make up the procedure involved in this latter case will be described below with reference to the flow chart of FIGS. 4A, 4B and 4C.

Step S1 - As the ignition switch of the engine is turned on to start the system operating, the throttle valve is driven to a standard position which, for example, substantially corresponds to the throttle opening angle during the idling of the automobile.

Step S2 - It is judged whether the auto-cruise signal has been received or not. In the mode of normal manual speed control, since no entry of this signal is involved, the operation proceeds to Step S3.

Step S3 - It is judged whether the auto-cruise flag has been set or not. In the mode of normal manual speed control, since the setting of this flag is not involved, the operation returns to Step S1. In the mode of manual speed control, therefore, the operation is circulated through the loop of Step S1→Step S2→Step S3→Step S1.

Step S4 - When the entry of the auto-cruise signal has been confirmed by the judgment of Step S2, the operation proceeds to Step S4, where the reading in of the real speed of the automobile, the setting of the auto-cruise flag, and the entry of the real speed of the automobile in the target automobile speed resister are executed.

Step S5 - The provisional target position of the throttle valve is read out of the set throttle position memory 19, according to the aforementioned target speed of the automobile.

Step S6 - The aforementioned provisional target position of the throttle valve is fed to the drive circuit to drive the throttle valve to that position.

Step S7 - It is judged whether the acceleration flag has been set or not. When this flag has not been set, the operation proceeds to Step S8.

Step S8 - It is judged whether the acceleration signal has been received or not.

Step S9 - It is judged whether the auto-cruise release signal has been received or not. When this signal has not been received, the operation proceeds to Step S10.

Step S10 - It is judged whether the automobile speed sampling timer has issued its output or not. When the output has not been issued, the operation returns to Step S7. After that, the operation is circulated through the loop of Step S8→Step S9→Step S10, awaiting the issuance of the output from the sampling timer. The operation proceeds to Step S11 when the timer issues its output.

Step S11 - The real speed of the automobile is read in and the value of compensation for the throttle position is circulated based on the deviation of the real speed of the automobile from the target speed of the automobile. Otherwise, the aforementioned value of compensation may be read out of a proper memory.

Step S12 - The value of compensation for the throttle position is fed to the drive circuit to drive the throttle valve by way of correction.

After this step, the processing returns to Step S7 and the auto-cruise control of the automobile is carried out by circulation through the loop of Step S7→Step S8→Step S9→Step S10→Step S11→Step S12.

When the acceleration signal is received while the aforementioned auto-cruise control is in process, the judgment of Step S8 yields an affirmative result. Thus, the operation proceeds to Step S13.

Step S13 - The real speed of the automobile as it exists at this moment is read in and the amount of the throttle opening angle to be increased is read out of the initial acceleration increment memory.

Step S14 - The acceleration flag is set up.

Step S15 - The acceleration signal continuation time counter for taking count of the time elapsing from the entry of the acceleration signal is reset.

After this step, the processing proceeds to Step S12. The increment of the throttle opening angle read out in the former step, Step S13, is fed to the drive circuit to increase the opening angle of the throttle valve proportionately.

Then, as the processing returns to Step S7, since the acceleration flag has already been set up, the processing proceeds to Step S16.

Step S16 - It is judged whether the presence of the acceleration signal is still continuing or not. When the acceleration signal is still present, the processing proceeds to Step S17.

Step S17 - It is judged whether the acceleration signal continuation time counter has issued its output or not. When this output has not been issued, the processing circulates through the loop of Step S16 and Step S17, awaiting the issuance of the output.

Step S18 - The content of the time counter is increased by "1" when the judgment of Step S17 confirms the issuance of the time counter output.

Step S19 - The value of compensation for the throttle position is read out of the acceleration pattern memory, with the count of time counter as the parameter.

After this step, the processing again proceeds to Step S12. The value of compensation for the throttle position which has been read out in the preceding step is fed to the drive circuit to effect gradual increase in the opening angle of the throttle valve.

The processing again returns from Step S7 to Step S16 and continues to be circulated through the loop of Step S17→Step S18→Step S19→Step S12→Step S7→Step S16, so long as the presence of the acceleration signal continues.

Step S20 - When the judgment of Step S16 has confirmed the disappearance of the acceleration signal, the real speed of the automobile as it exists is read in and the amount of the throttle opening angle to be decreased is read out of the post-acceleration decrement memory.

Step S21 - The acceleration flag is reset.

Step S22 - The real speed of the automobile formerly read in Step S20 is stored in the target automobile speed register.

After this step, the processing proceeds to Step S12. The amount of the throttle opening angle to be decreased which has been read out in Step S20 is fed to the drive circuit to drive the throttle valve in the direction of decreasing the opening angle.

As the processing returns again to Step S7, since the acceleration flag has been already reset, the processing is made to proceed to Step S8. Since the acceleration signal has already disappeared, the processing is circulated through the loop of Step S9→Step S10→Step S11→Step 12.

In the manner described above, the auto-cruise control is carried out with the real speed of the automobile existing after acceleration taken as the target. When the auto-cruise release signal is received while the auto-cruise control is in process, the judgment in Step S9 yields an affirmative result. Thus, the processing is advanced to Step S23.

Step S23 - The auto-cruise flag is reset and the processing returns to Step S1. Then, the throttle valve is driven to the position of the standard opening angle and the operation is returned to the initial manual speed control mode.

What is claimed is:

1. An apparatus for the control of the speed of an automobile while in transition from manual control to auto-cruise, comprising in combination:
   means for providing an auto-cruise set signal when control of the speed of said automobile is to be transferred from manual control to auto-cruise control, means for sampling the real speed of the automobile at predetermined time intervals, a first register, operative in response to said sampling means and the occurrence of said auto-cruise set signal, to store as a target speed the real speed of the automobile which exists at the moment of occurrence of said set signal, a set throttle position memory for storing a provisional target throttle position at the time of auto-cruise setting with said target speed of the automobile as a parameter therefor, a second register for storing the provisional target throttle position read out of said memory based on the real speed of the automobile as it exists at the time of occurrence of said auto-cruise set signal, means responsive to occurrence of said auto-cruise set signal and to the data stored in said second register for initially setting the position of the automobile throttle to said provisional target throttle position, means for finding a deviation of said real speed of the automobile from said target speed, means for computing an amount of compensation for throttle position based on said deviation, means for changing the data stored in said second register by adding said amount of compensation to the contents of said second register, and means for controlling the automobile throttle position on the basis of the changing data stored in said second register.

2. An apparatus as claimed in claim 1 wherein said provisional target throttle position is the position which corresponds to the target speed of the automobile applicable to the travel of the automobile on a flat road.

3. An apparatus for the control of the speed of an automobile while in transition from manual control to auto-cruise, comprising in combination:

means for sampling the real speed of the automobile at predetermined time intervals, a first register, operative in response to said sampling means and entry of an auto-cruise set signal, to store as a target speed the real speed of the automobile as it exists at the moment of entry of said set signal, at least two different set throttle position memories each of which stores a provisional target throttle position at the time of auto-cruise setting with said target speed of the automobile as a parameter therefor, means for selecting one of said two set throttle position memories, means for reading out the data stored in said selected one of said memories, a second register for storing the provisional target throttle position read out of said selected one of said two memories based on the real speed of the automobile as it exists at the time of entry of said auto-cruise set signal, means responsive to the data stored in said second register for initially setting the position of the automobile throttle to said provisional target throttle position, means for finding a deviation of said real speed of the automobile from said target speed, means for computing an amount of compensation for throttle position based on said deviation, means for adding said amount of compensation to the contents of said second register, and means for controlling the position of the automobile throttle based on the contents of said second register.

* * * * *